United States Patent

Fredlund et al.

[11] Patent Number: 6,139,892
[45] Date of Patent: Oct. 31, 2000

[54] METHOD OF REDUCING THE CONTENT OF PHYTATE AND HIGH DEGREE OF PHYTASE IN CEREALS AND CEREAL PRODUCTS HAVING A REDUCED CONTENT OF PHYTATE

[75] Inventors: Kerstin Fredlund, Kalmar; Leif Christensen; Håkan Almén, both of Stockholm, all of Sweden; Juhani Olkku, Lahti, Finland; Pekka Reinikainen, Fin, Finland; Veli-Matti Tuokkuri, Lathi, Finland; Ann-Charlotte Eliasson, Lund, Sweden; Erik Svensson, Lund, Sweden; Ingegerd Sjöholm, Lund, Sweden; Inger Ahldén, Lund, Sweden; Nils-Georg Asp, Lund, Sweden; Lars-Börje Sjöberg; Catharina Tennefors, both of Stockholm, Sweden; Hans Lingnert, Göteborg, Sweden; Annika Rutgersson, Göteborg, Sweden; Ann-Sofie Sandberg, Göteborg, Sweden; Eva-Lotta Bergman, Göteborg, Sweden; Lennart Wikström, Malmö, Sweden; Karin Autio, Espoo, Finland; Teja Parkkonen, Espoo, Finland; Auili Haikara, Espoo, Finland; Erna Storgårds, Espoo, Finland; Juha Ahvenainen, Espoo, Finland

[73] Assignees: Semper AB, Stockholm, Sweden; OY Lahden Polttimo, Lahti, Finland; Skanska Lantmannen, ek. for, Malmo, Sweden

[21] Appl. No.: 09/254,678
[22] PCT Filed: Sep. 17, 1997
[86] PCT No.: PCT/SE97/01569
    § 371 Date: Jul. 7, 1999
    § 102(e) Date: Jul. 7, 1999
[87] PCT Pub. No.: WO98/11788
    PCT Pub. Date: Mar. 26, 1998

[30] Foreign Application Priority Data

Sep. 18, 1996 [SE] Sweden .................................. 9603407

[51] Int. Cl.$^7$ .......................... A23L 1/211; A23L 1/182; A23L 1/10
[52] U.S. Cl. .......................... 426/458; 426/459; 426/463; 426/622; 426/623
[58] Field of Search .................................... 426/618, 619, 426/622, 623, 455, 456, 458, 459, 463, 506

[56] References Cited

U.S. PATENT DOCUMENTS

| 4,375,431 | 3/1983 | Bradford et al. | 260/123.5 |
|---|---|---|---|
| 5,248,765 | 9/1993 | Mazer et al. | 530/372 |
| 5,554,399 | 9/1996 | Vanderbeke et al. | 426/49 |
| 5,891,708 | 4/1999 | Saniez et al. | 435/243 |

FOREIGN PATENT DOCUMENTS

| 0 380 343 | 8/1990 | European Pat. Off. |
| 0 619 369 | 10/1994 | European Pat. Off. |
| 505 893 | 10/1997 | Sweden . |

Primary Examiner—Nina Bhat
Attorney, Agent, or Firm—Larson & Taylor

[57] ABSTRACT

A method for reducing the content of phytate and/or salts thereof, formed by phytic acid, in cereal grains, whereby the cereal grains are subjected to a combined wet steeping and dry steeping in at least two successive cycles in that the cereal grains are mixed with water or a water mixture to a water content in the cereal grains of 25–60%, the pH value is adjusted to pH 4–7, the mixture is heated to 35–60° C. and is subjected to wet steeping for a period of 0.5–10 hours, eventual excess of water or water solution is drained, and the cereal grains are dry steeped for a period of 0.5–20 hours at a temperature of 35–60° C., whereupon the cereal is finally dried. The cereal can be taken out of the process as whole grains, as flakes, as cut grains or as flour.

13 Claims, 5 Drawing Sheets

Hydrothermal treatment
(l.a. = content lactic acid — wc = water content)

of Millet

Temp. = 50°C

| wet steeping I | 6 h |
|---|---|
| l.a. = 1.5% | |
| pH = 4.62 | wc = 35.4% |

| dry steeping I | 6 h |
|---|---|
| pH = 4.75 | wc = 36.4% |

| wet steeping II | 6 h |
|---|---|
| l.a. = 1.5% | |
| pH = 4.19 | wc = 37.4% |

| dry steeping II | 20 h |
|---|---|
| pH = 4.75 | wc = 36.4% |

| drying | |
|---|---|
| 8 h 50°C $\xrightarrow{2h}$ 8 h 80°C | |

Fig. 5 of Maize

Temp. = 50°C

| wet steeping I | 1 h |
|---|---|
| l.a. = 1.5% | |
| pH = 4.22 | wc = 35.4% |

| dry steeping I | 5 h |
|---|---|
| pH = 4.52 | wc = 35.0% |

| wet steeping II | 1 h |
|---|---|
| l.a. = 0.75% | |
| pH = 4.23 | wc = 38.3% |

| dry steeping II | 15 h |
|---|---|
| pH = 4.42 | wc = 40.2% |

| drying | |
|---|---|
| 8 h 50°C $\xrightarrow{2h}$ 8 h 80°C | |

Fig. 6

METHOD OF REDUCING THE CONTENT OF PHYTATE AND HIGH DEGREE OF PHYTASE IN CEREALS AND CEREAL PRODUCTS HAVING A REDUCED CONTENT OF PHYTATE

The present invention relates to a method of reducing the content of phytate emanating from phytic acid, and high degree of phytase, in intact grains of cereals, in particular grains of cereals like wheat, rye, rye wheat, barley, oats, but also cereals like maize, rice, millet, sorghum etc. thereby making it possible to simply, cheaply and effectively preparing a product of intact cereal grains having a high quality, having a high microbiological quality, having a good shelf life and having a good bioavailability of minerals and of myo-inositol, having a suitable degree of gelatinization of starch and having a high sensoric and rheologic quality.

The invention also relates to cereal products processed according to the present invention. A product of this type is very well suited for preparing all kinds of cereal products like bread, porridge, flakes, milk cereal drinks etc. The product is also well suited as animal feedstuff.

Phytate (myo-inositol hexaphosphate) emanating from phytic acid is, present in all kinds of cereals and corresponds to 50–85% of the total content of phosphorus in the grains. The cereal grains have a high degree of valuable minerals and trace elements, which are, however, bound by phytate, and this negatively affects the possibility of the intestine of human beings and animals to absorb said valuable minerals and trace elements, for instance iron, zinc, calcium, magnesium and other minerals, in particular divalent metals. The grains also contain the enzyme phytase which is capable of hydrolysing the phytate to free myo-inositol. Thereby said minerals and trace elements are released so as to be able to become absorbed in the intestine. Such free myo-inositol also is important for a satisfactory growth of children and also has clinical effect at certain conditions of illness.

Already in 1920 it was found that cereals has a rachitical effect on dog puppies, and later studies of puppies have shown that rachitis appears depending on the content of phytate in cereals. It has also been found that phytate affects the possibility of absorption of calcium and phosphorus of human beings, and there are clear evidences that the absorption of both calcium and phosphorus, iron and zinc is increased if the content of phytate in cereals is reduced.

It is known that the content of phytate can be reduced in flour in that said flour is mixed with water. This depends on the influence of the enzyme phytase which is naturally present in cereals and which reduces phytate (myo-inositol hexaphosphate) by hydrolysis into free myo-inositol and organic phosphates. Phytase is inactive in dry cereals but is activated when the moisture content is increased. Optimum conditions for phytase in wheat is said to be 50–60° C. and pH 4.5–5.5. Phytase in rye is said to have high activity under corresponding conditions.

A flour-water mixture which is dried, however, provides a product which is very susceptible to oxidation and which has therefore a restricted shelf-life (the product turns rancid).

The basis of the invention has been the problem of suggesting a method according to which whole cereal grains can be treated so that the content of phytate therein is strongly reduced and so that a product is obtained comprising whole intact cereal grains having a high quality, having a high microbiological quality and a good stability against oxidation and a good shelf life, having a good bioavailability of minerals and myo-inositol, having a suitable degree of gelatinization of starch and a high sensoric and rheologic quality.

As known so far, it has not been possible to provide a method by means of which the content of phytate can be reduced in intact grains of cereals.

Surprisingly it has now been proved possible to reduce the content of phytate in intact cereal grains, in some cases by more than 95% in that the grains are subjected to a hydrothermal treatment in the form of a repeated process comprising wet steeping and thereafter a dry steeping of the cereal grains.

According to the invention this is made in that the cereal grains are treated, in two or more process steps, with water or a water solution having a predetermined temperature, which process is named wet steeping, and whereafter eventual excess of water is drained and the grains are heat treated at a predetermined temperature, named dry steeping. After a desired number of processes including wet steeping + dry steeping the product is subjected to final drying.

The wet steeping preferably is performed by means of water the pH value of which has been set to pH 4–7, and the temperature of which is 35–60° C. The wet steeping is performed for a period of time of 0.5–10 hours. There should be a relatively low content of water, for instance 1.5 parts by weight of water for 1 part per weight of grains. After eventual excess of water has been drained there follows a dry steeping at a temperature of 35–60° C. for a period of 0.5–20 hours. The cereal grains are preferably steeped to a final water content of 25–60%. Finally the cereal grains are dried at a temperature of between 40 and 110° C.

The invention is also applicable for treatment of cereal grains in such a way that the grains obtain a high content of phytase making a degradation of phytate possible in the digestive tract. Such treatment is possible by choosing a lower steeping temperature, and in that the cereal grains, during the final drying step, after the hydrothermal treatment, are dried slowly and at a relatively low temperature.

The invention also relates to a product processed in accordance with the invention and which has a low content of phytic acid (phytate) having been degraded by endogenous phytase or in that the product has a high content of endogenous phytase which degrades phytate existing in the product in the intestine of the human or animal eating the product.

BRIEF DESCRIPTION OF THE DRAWINGS

In the accompanying drawings

PRINCIPLE PROCESS

Figure 1:
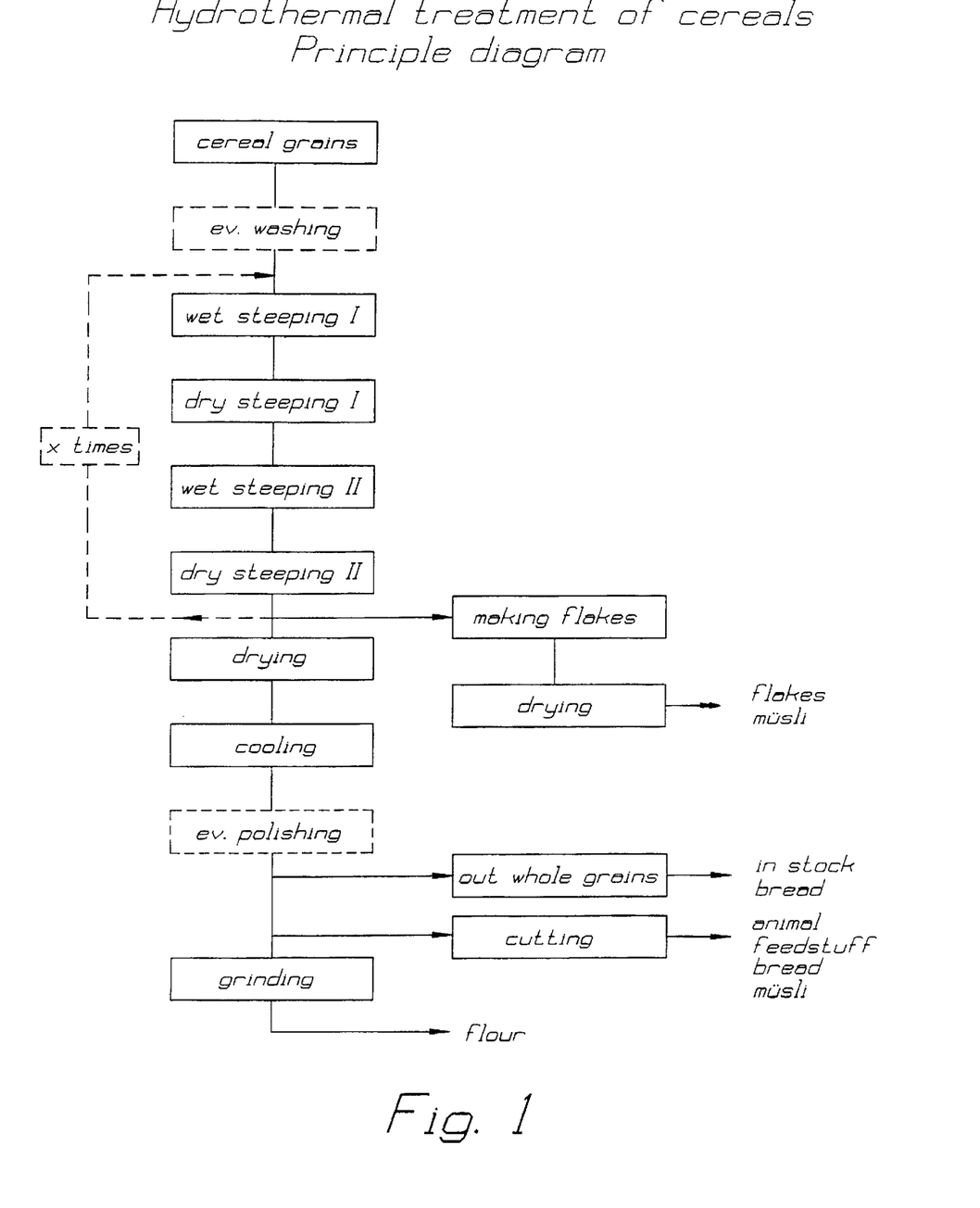
FIG. 1 shows a principle flow diagram of hydrothermal treatment of cereal grains.

In an embodiment of the method, which is illustrated as a principle process in FIG. 1, whole intact cereal grains are, in a first wet steeping step, mixed with water to a water content of the cereal grains of 25–45%, pH is adjusted to 4–7, and the entire batch is heated to 35–60° C. and is kept at said temperature for 0.5–10 hours. Thereafter eventual excess of water is drained and a dry steeping is performed for a period of 0.5–20 hours at a temperature of 35–60° C. One or more further combined cycles including wet steeping + dry steeping follow, at which the water content is slightly higher than during the first wet steeping step, for instance 35–60%, and in which the dry steeping can be performed at the same temperature as that of the wet steeping step, that is at 35–60° C. The drying of the intact cereal grains is performed at a temperature of 40–110° C., preferably for such long time that the cereal grains get a moisture content of less than 10%, whereupon the grains are cooled.

By the above mentioned process a reduction of the content of phytate can, for most types of cereals, be obtained by up to 95%, and even more, as evident from the following tables.

After the final drying the cereal grains can be used as whole grains, or they can be treated as required for the forthcoming use thereof, for instance by surface polishing for removal of hull or husk, eventually by cutting and by grinding into flour thereof.

It is alternatively also possible to press the grains into flakes after the final dry steeping step, which flakes are dried and are used as known in the art.

The setting of pH at the wet steeping steps preferably is made by adding some organic acid or some buffer, for instance lactic acid, whey, citric acid or an acetate buffer, or by an addition of a naturally acid containing product, for instance fruit juice, or by an addition of a lactic acid producing bacteria.

The water used for the wet steeping can be added as plain water, as a water solution, as whey or fruit juice, or as steam.

For increasing the water content of the cereal grains to be treated different pressures can be used, for instance atmospheric pressure, over pressure and sub pressure.

It is evident from FIG. 1 that the cycle including the combination of wet steeping and dry steeping can be repeated any desired number of times, as marked with the flow lines of the figure. For each steeping cycle the content of phytate of the cereal grains is reduced. Various types of cereals react with different speeds. For instance, for wheat, rye, rye-wheat, barley, millet, maize and rice it can be sufficient to perform two successive cycles including wet steeping + dry steeping. Oats may require several steeping cycles.

EXAMPLE 1 (barley, cultivar Blenheim)

In a first example was treated cereal grains of the kind barley (cultivar Blenheim), in that the grains were mixed with water to a water content of 30–55%. The pH of the steeping water was adjusted, by an addition of lactic acid, to a concentration of the water of 0.80%. The mixture of barley and water was heated to 48° C. and was kept at atmospheric pressure for 1 hour. The water was drained and the content of grains was kept at a temperature of 48° C. for 5 hours.

A second wet steeping was performed with the same amount of water and at the temperature 50° C. for 1 hour. A dry steeping was performed at 50° C. for 15 hours, and the still intact grains were thereafter dried at 50° C. for 8 hours, during 2 hours of which the temperature was increased to 80° C. and thereupon for another 6 hours maintaining the temperature at 80° C. Finally the grains were cooled to room temperature.

A checking proved that the content of phytate had decreased drastically; the grains had such water content that they could directly be packed for later use. The organoleptic stability was checked after 6 months and was judged to be good. It could be established that the grains had a good microbiological quality and that the degree of gelatinization of starch was such that cereal products could be prepared from the treated grains.

The grains originally contained the following levels of phosphates, named $IP_3$ (myo-inositol triphosphate)=0.36 $\mu$mol/g dry matter content, $IP_4$ (myo-inositol tetraphosphate)=0.12 $\mu$mol/g dry matter content, $IP_5$ (myo-inositol pentaphosphate)=0.44 $\mu$mol/g dry matter content, and $IP_6$ (myo-inositol hexaphosphate)=13.88 $\mu$mol/g dry matter content.

In the following the designation IP with a hanging index will be used as the unit for $\mu$mol/g dry matter content of phosphate in the grains.

The content of phosphate of the type $IP_6$ and of the type $IP_5$ are the most important contents as concerns the reduction of total amount of phytate in the grains of cereals, and it has been shown that an eventual increase of other phosphates is not of any noticeable importance. To this end only the percentual reduction of the phosphate $IP_6$ is given in the following tables as "Red. $IP_6$ (%)". In the tables there is given, for practical reasons, the degree of acidity as percentage lactic acid in the water during the wet steeping step as "l.a. (%)".

After the above described two stage hydrothermal treatment the content of phosphate $IP_6$ had decreased by 96% as compared with the phosphate content of the untreated raw material. In the following table there is given the results of the contents of $IP_{1-6}$ and the reduction the content of phytate in the type of cereals in this example.

| Test | $T_1$ (° C.) | $T_2$ (° C.) | l.a. (%) | $IP_3$ | $IP_4$ | $IP_5$ | $IP_6$ | Red. $IP_6$ (%) |
|---|---|---|---|---|---|---|---|---|
| Raw material | — | — | — | 0.36 | 0.12 | 0.44 | 13.88 | — |
| Test 1 | 48 | 50 | 0.80 | 1.38 | 0.67 | 0.14 | 0.50 | 96 |

EXAMPLES 2–13 (barley)

A series of further tests were made with the same type of cereals as in example 1 but with different temperatures in the two wet steeping and dry steeping stages, and with 1.5 parts by weight of water per one part by weight of barley. The results are given in the following table:

| Test | $T_1$ (° C.) | $T_2$ (° C.) | l.a. (%) | $IP_3$ | $IP_4$ | $IP_5$ | $IP_6$ | Red. $IP_6$ (%) |
|---|---|---|---|---|---|---|---|---|
| Test 2 | 55 | 55 | 0.6 | 2.92 | 2.07 | 0.47 | 1.86 | 87 |
| Test 3 | 55 | 65 | 0.8 | 1.64 | 1.84 | 0.77 | 3.22 | 77 |
| Test 4 | 45 | 55 | 0.8 | 2.37 | 1.74 | 0.41 | 1.70 | 88 |
| Test 5 | 48 | 50 | 0.8 | 1.73 | 0.79 | 0.15 | 0.66 | 95 |
| Test 6 | 48 | 48 | 0.84 | 1.84 | 1.02 | 0.27 | 1.29 | 91 |
| Test 7 | 55 | 55 | 0.00 | 1.44 | 0.97 | 0.62 | 5.51 | 60 |
| Test 8 | 55 | 55 | 0.1 | 1.66 | 1.30 | 0.68 | 4.84 | 65 |
| Test 9 | 55 | 65 | 0.4 | 1.11 | 1.46 | 0.80 | 4.94 | 64 |
| Test 10 | 55 | 55 | 0.4 | 1.95 | 1.70 | 0.44 | 2.28 | 84 |
| Test 11 | 50 | 60 | 0.6 | 2.28 | 2.05 | 0.52 | 2.53 | 82 |
| Test 12 | 54 | 65 | 0.4 | 1.14 | 1.58 | 0.97 | 6.05 | 56 |
| Test 13 | 55 | 65 | 0.4 | 1.28 | 1.43 | 0.84 | 4.53 | 67 |

It is evident from the above table that the hydrothermal treatment of barley, performed in two stages, provides a reduction of the content of phosphate of the type IP6 by up to 95% (example 5), which phosphate is the most serious obstacle, from nutrient viewpoint and other viewpoints, against a high quality and preferred product comprising intact cereal grains of the cereal barley.

It is also evident, considering the results of the performed tests, that there are two main parameters which are of decisive importance for the reduction of the content of $IP_6$ in the grains, namely the temperature and the degree of acidity, which is given above as percentage of lactic acid (l.a.) in the water. The optimum temperature both at the wet steeping and at the dry steeping is 45–55° C. The optimum acidity is at 0.4–0.8% lactic acid, which corresponds to pH 4–6.

EXAMPLE 14 (barley)

The same test was made as in example 6 but for the difference that the first dry steeping step was extended to 21 hours, and that the second wet/dry steeping stage was excluded. Both in the wet steeping stage and in the dry steeping stage the temperature was thus kept at 48° C. and the content of lactic acid was 0.84%.

In this case there was obtained a reduction of the content of $IP_6$ of 73%. This indicates that a repeated process provides an increased reduction of the degree of phosphate of the type $IP_6$.

EXAMPLE 15 (barley)

This test was performed like in example 6 but for the difference that the addition of lactic acid in the water was 0.8%, that the first wet steeping stage was extended to 5 hours, that the first dry steeping stage was extended to 17 hours, and that the second wet/dry steeping stage was excluded. The temperature was, at both the wet steeping stage and the dry steeping stage, 48° C., and the content of lactic acid in the water was 0.8%.

In this case there was obtained a reduction of the content of $IP_6$ of 52%, which is a lower value than that of example 6. The present example proves that it is important that the cycle including wet steeping combined with dry steeping is repeated twice.

It is obvious from the above tables that the best results are obtained when the temperature $T_1$ in the first wet and dry steeping stage is kept at 48° C. and that the temperature $T_2$ is kept at 50° C. (tests 1 and 5), and that minor differences from said values reduce the degree of reduction. In spite of a very prolonged dry steeping time (test 14) and a very prolonged wet steeping time (test 15), and with excluded second wet/dry steeping cycle, a less good result was obtained. Thus, the reduction of the content of $IP_6$ is not solely depending on the temperature. On the contrary it has been shown that repeated wet/dry steeping cycles gives a strongly improved effect with respect to reduction of phytate.

The content of myo-inositol phosphate in the cereal grains was determined in that the grains (0.5 g) were ground and extracted in 20 ml 0.5 M HCl for 3 hours. The extract was centrifuged, the supernatant was decanted, was freezed over a night, was thawed and was centrifuged twice. After the second centrifugation a 15 ml sample of the supernatant was evaporated to dryness and was solved in 0.025 M HCl. The myo-inositol phosphates were separated from the raw extract by ion exchange chromatography. For analysis of the steeping water a sample of 20 ml water was added directly to the ion exchange chromatography column. The content of inositol hexa-, penta-, tetra- and triphosphates were determined by ion pair C18 reversing phase HPLC using formic acid/methanol and tetrabutylammonium hydroxide in the movable phase. C18 Chromasin (5 μm) column i.d. The flow speed was 0.4 ml/min.

The pH during the steeping was measured by extracting a sample, grinding and suspending the sample and thereafter measuring the pH in the water suspension thereby obtained.

EXAMPLES 16–20 (rye, cultivar Motto)

In a preferred process, relating to steeping of rye, cereal grains were mixed with water to a water content of 31–58%, the pH was adjusted to pH 4.2–6.6, the mixture was heated to 45–55° C. and was wet steeped for a period of 0.5–1 hour at 45–55° C. Thereafter the water was drained and a dry steeping was performed for a period of 1–5 hours. A repeated wet steeping was performed at 45–55° C., also in this case for a period of 0.5–1 hour, whereupon the water was drained from cereal grains and a dry steeping was performed for a period of 1–20 hours at 45–55° C., whereupon the cereal grains were finally dried. Several tests were made for studying the reduction of phytate, which tests are made account for in the following table.

By the invention there is consequently obtained a reduction of phytate by at least 19% (example 16, without any addition of lactic acid), and in the best case there is obtained a reduction of phytate by nearly 100% (example 19, 1.5% lactic acid in the water).

| Test | $T_1$ (° C.) | $T_2$ (° C.) | l.a. (%) | $IP_3$ | $IP_4$ | $IP_5$ | $IP_6$ | Red. $IP_6$ (%) |
|---|---|---|---|---|---|---|---|---|
| Raw material | — | — | — | 0.00 | 0.00 | 0.59 | 12.93 | — |
| Test 16 | 45 | 45 | 0.00 | 0.11 | 0.14 | 1.14 | 10.46 | 19 |
| Test 17 | 45 | 45 | 1.5 | 0.25 | 0.12 | 0.21 | 2.09 | 84 |
| Test 18 | 50 | 50 | 0.75 | 0.24 | 0.13 | 0.20 | 2.15 | 83 |
| Test 19 | 55 | 55 | 1.5 | 0.00 | 0.09 | 0.00 | 0.06 | 99.5 |
| Test 20 | 55 | 55 | 0.00 | 0.13 | 0.08 | 0.46 | 6.22 | 52 |

EXAMPLES 21–24 (wheat, cultivar Kosack)

A series of tests were performed with grains of wheat, cultivar Kosack. The results are given in the following table:

| Test | $T_1$ (° C.) | $T_2$ (° C.) | l.a. (%) | $IP_3$ | $IP_4$ | $IP_5$ | $IP_6$ | Red. $IP_6$ (%) |
|---|---|---|---|---|---|---|---|---|
| Raw material | — | — | — | 0.1 | 0.1 | 0.3 | 10.6 | — |
| Test 21 | 55 | 55 | 0.00 | 0.2 | 0.1 | 0.7 | 8.0 | 24 |
| Test 22 | 45 | 45 | 1.5 | 0.2 | 0.2 | 0.4 | 4.3 | 59 |
| Test 23 | 55 | 55 | 1.5 | 0.4 | 0.2 | 0.1 | 0.6 | 94 |
| Test 24 | 50 | 50 | 0.75 | 0.2 | 0.2 | 0.5 | 4.9 | 54 |

The above, latest performed tests made on wheat grains confirm the results obtained at tests with barley and rye, and in which the temperature and the content of lactic acid in the water (=the pH value) is of determining importance for the reduction of phytate.

Also at wet steeping/dry steeping of wheat there is obtained a reduction of phytate by up to 94% at a twice repeated steeping cycle.

EXAMPLES 25–26 (naked oats, cultivar Mozart)

Figure 2:
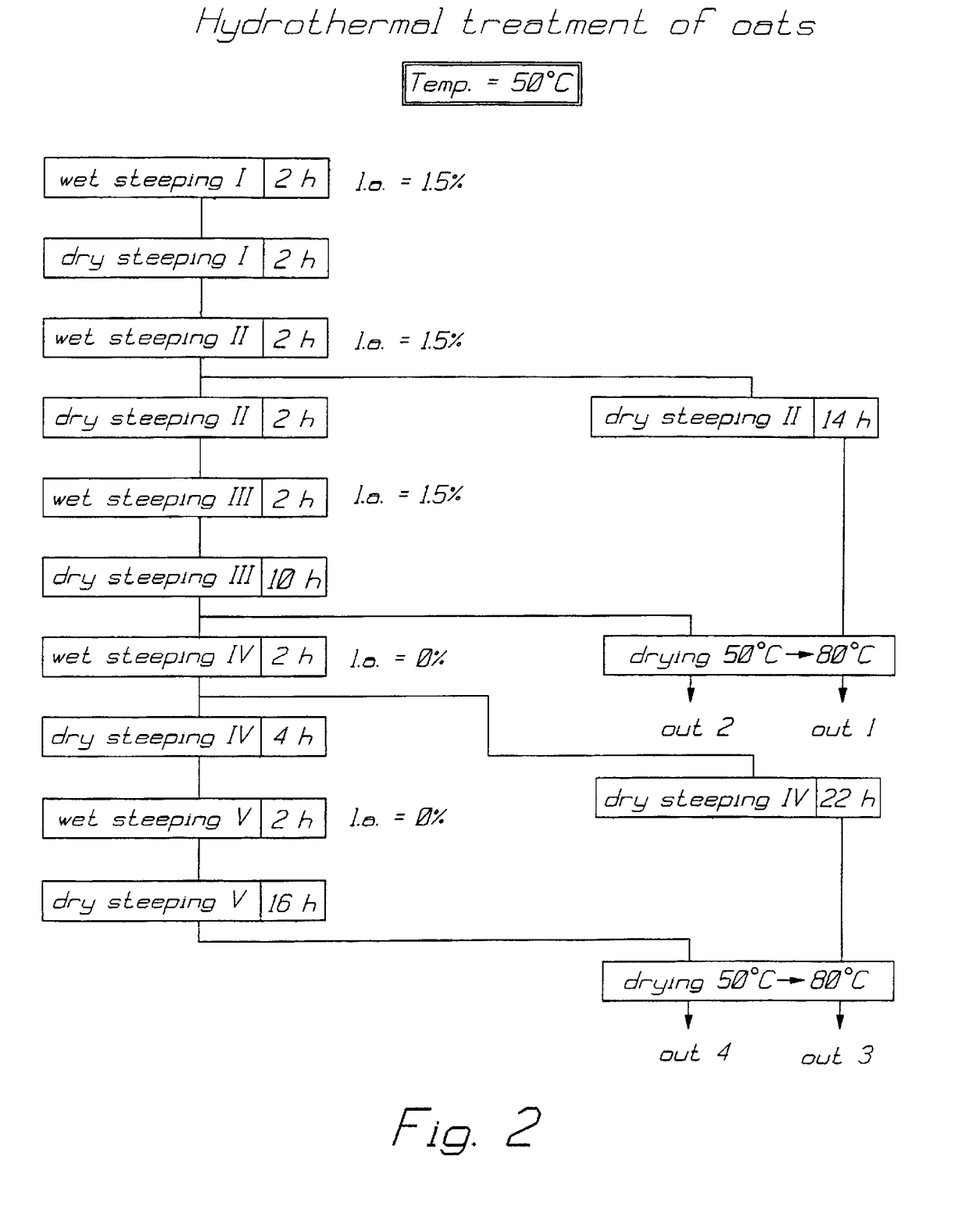
FIG. 2 shows a flow diagram of hydrothermal treatment of oats at a temperature of 50° C., corresponding to the following example 25.

At tests with wet steeping/dry steeping of oats there were observed certain difficulties in obtaining the same good effect than at treatment of other types of cereals. It was shown, however, that a several fold steeping cycle gave a satisfactory result in the form of a reduction of phytate. In the following example 25 there were performed five successive steeping cycles at a temperature of 50° C., and the reduction of phytate was determined after the cycle 2, 3, 4 and 5, referred to as Out 1, Out 2, Out 3 and Out 4 in FIG. 2.

EXAMPLE 25 (naked oats, 50° C.)

| Phosphate | $IP_3$ | $IP_4$ | $IP_5$ | $IP_6$ | Red. $IP_6$ (%) |
|---|---|---|---|---|---|
| Raw material | 0.08 | 0.06 | 0.43 | 15.67 | — |
| Output 1 | 0.00 | 0.08 | 0.46 | 15.64 | 2 |
| Output 2 | 0.00 | 0.59 | 1.86 | 12.55 | 20 |
| Output 3 | 0.00 | 0.53 | 1.63 | 11.32 | 28 |
| Output 4 | 0.00 | 0.44 | 1.46 | 10.91 | 30 |

Figure 3:
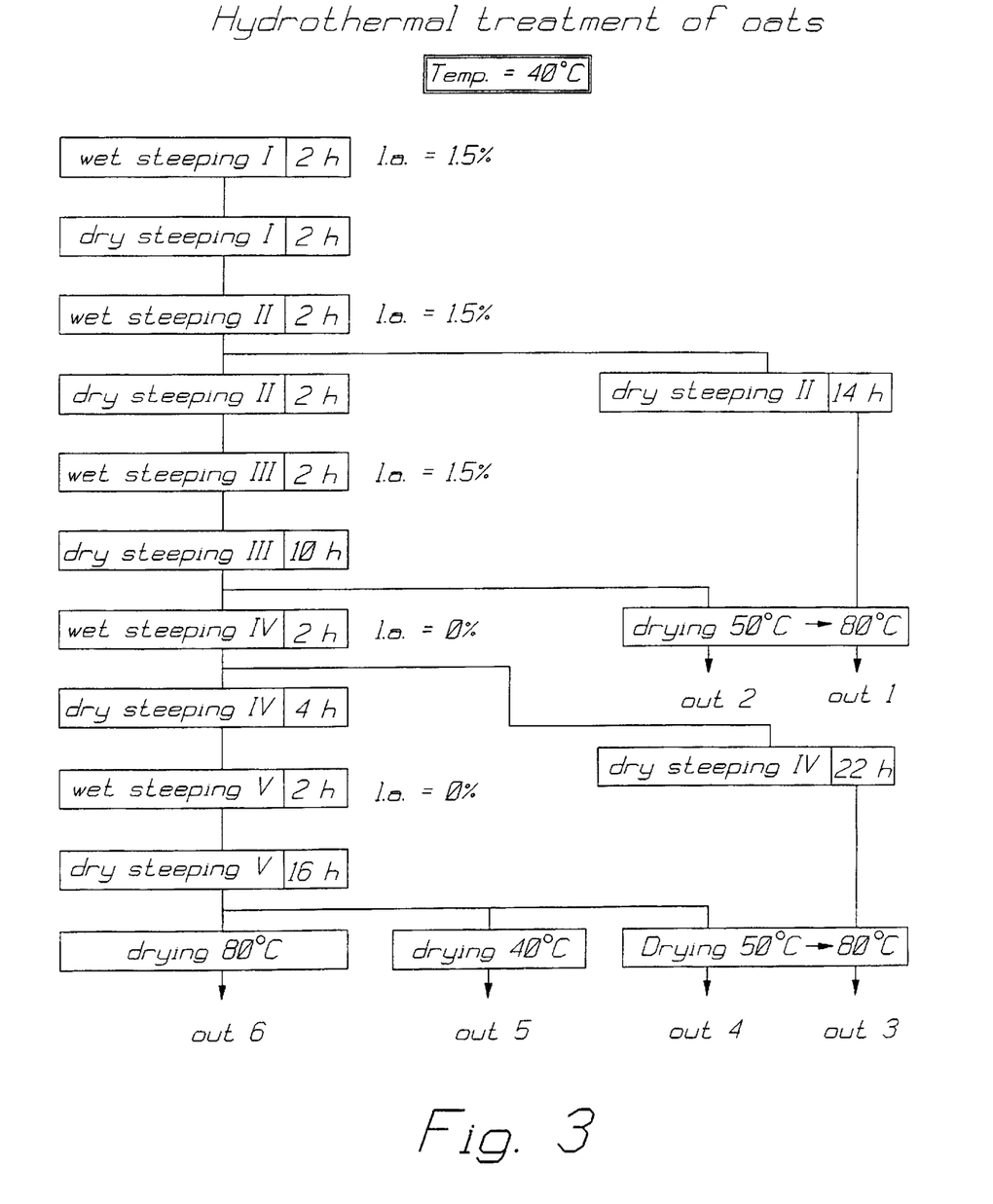
FIG. 3 correspondingly shows a practical example of hydrothermal treatment of oats at a temperature of 40° C., as described in the following example 26.

In the following example 26, which is also diagrammatically shown in FIG. 3, the combined wet steeping and dry steeping process was repeated in five successive cycles. Samples were taken out for analysis of the content of phytate in the oats grains. The table shows how the contents of remained phytate change after each successive steeping cycle and each respective way of drying same, in some cases upwards, in other cases downwards. Samples were taken at six different outputs marked Out 1–6 in FIG. 3. Also in this case there is a possibility to choose exactly the reduction of phytate that is desired to obtain. The same, of course, can be made during treatments of other types of cereals having such relatively slow reduction of phytate as that of oats, where it can be necessary to repeat the steeping cycle three or more times.

EXAMPLE 26 (naked oats, 40° C.)

| Phosphate | $IP_3$ | $IP_4$ | $IP_5$ | $IP_6$ | Red. $IP_6$ (%) |
|---|---|---|---|---|---|
| Raw material | 0.08 | 0.06 | 0.43 | 15.67 | — |
| Output 1 | 0.91 | 1.22 | 2.36 | 12.45 | 20 |
| Output 2 | 0.76 | 1.03 | 2.31 | 12.89 | 18 |
| Output 3 | 1.20 | 1.60 | 2.45 | 8.86 | 43 |
| Output 4 | 1.00 | 1.51 | 2.15 | 8.15 | 48 |
| Output 5 | 1.03 | 1.42 | 2.09 | 9.38 | 40 |
| Output 6 | 1.12 | 1.58 | 2.41 | 8.96 | 43 |

EXAMPLE 27 (naked oats, 35° C.)

Figure 4:
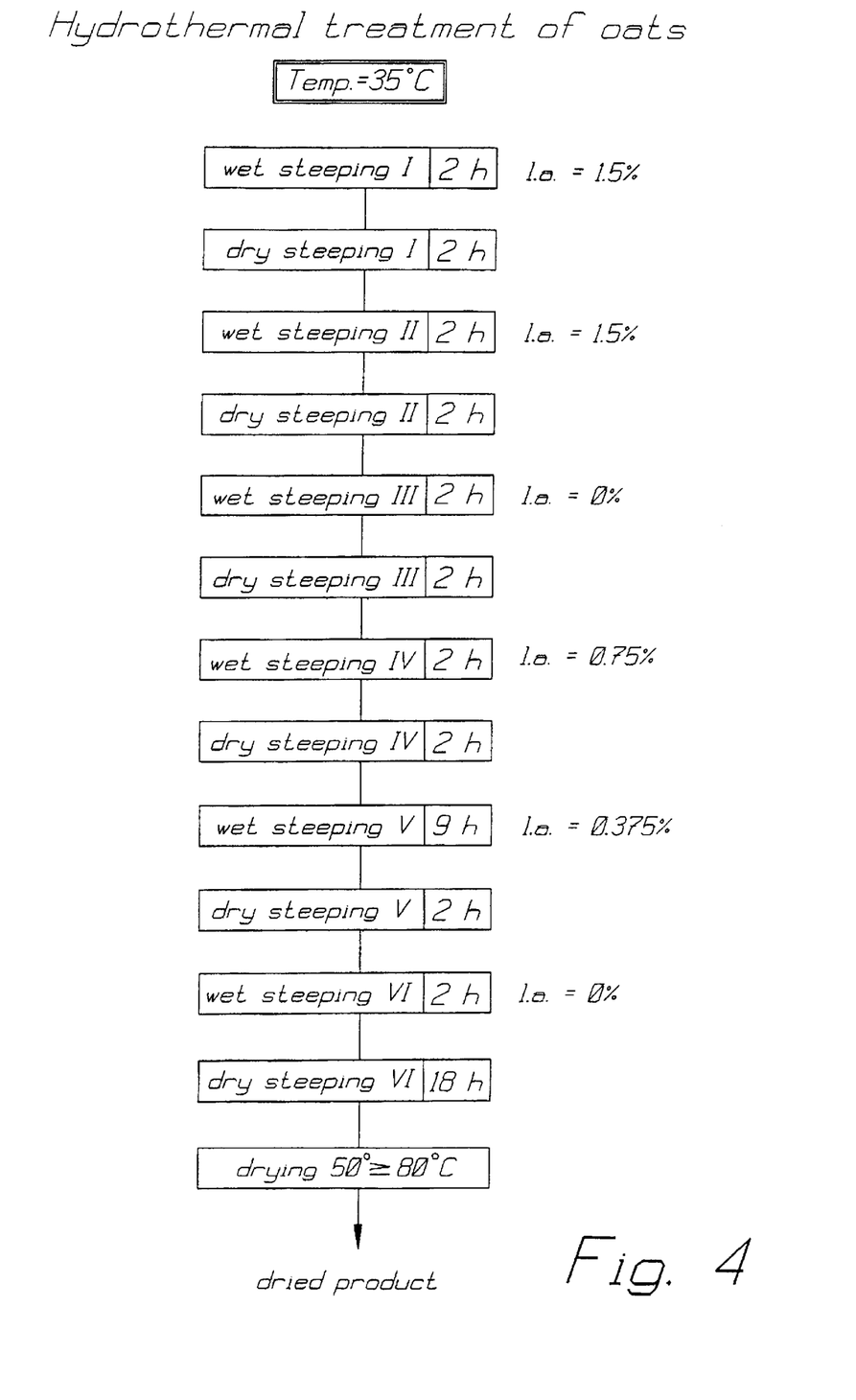
FIG. 4 correspondingly shows a practical example of hydrothermal treatment of oats, in which example the temperature was throughout 35° C.

Tests were made according to the process illustrated in FIG. 4 with the type of cereals named naked oats. The temperature was throughout 35° C. In the figure there is mentioned, for all six wet steeping stages, the percentual content of lactic acid.

| Phosphate | $IP_3$ | $IP_4$ | $IP_5$ | $IP_6$ | Red. $IP_6$ (%) |
|---|---|---|---|---|---|
| Raw material | 0.08 | 0.06 | 0.43 | 15.67 | — |
| Output | 0.48 | 1.16 | 1.79 | 8.29 | 47 |

EXAMPLE 28 (millet)

A test was performed with the type of cereals millet in the same way as described above. The result shows that the same good effect is obtained as at hydrothermal treatment of other types of cereals. The result is shown in the following table:

| Phosphate | $IP_3$ | $IP_4$ | $IP_5$ | $IP_6$ | Red. $IP_6$ (%) |
|---|---|---|---|---|---|
| Raw material | traces | 0.04 | 0.55 | 9.82 | — |
| Millet grains | 1.09 | 0.96 | 1.21 | 3.44 | 65 |

Figure 5:
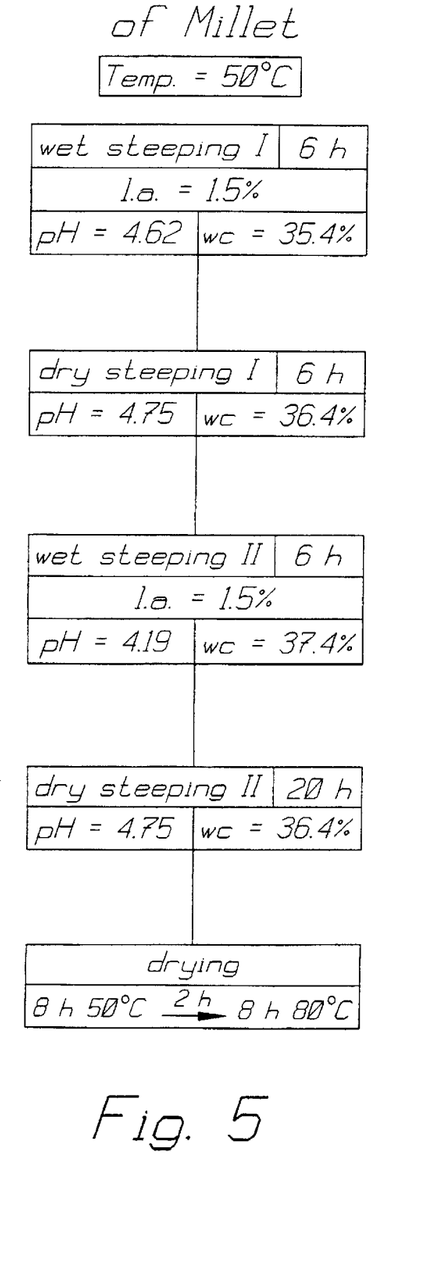
FIG. 5 correspondingly shows a steeping diagram relating to millet, at a throughout temperature of 50° C.

The test was performed in a two stage cycle comprising wet+dry+wet+dry steeping at a temperature of 50° C. and at a pH value of 4.2–4.8. A steeping scheme relating to the above mentioned test is shown in FIG. 5.

EXAMPLE 29 (maize)

A test was made with maize in the same way as described above. The result is shown in the following table:

| Phosphate | $IP_3$ | $IP_4$ | $IP_5$ | $IP_6$ | Red. $IP_6$ (%) |
|---|---|---|---|---|---|
| Raw material | 0.00 | 0.04 | 0.5 | 10.39 | — |
| Maize grains | 0.34 | 0.42 | 1.06 | 6.74 | 35 |

Figure 6:
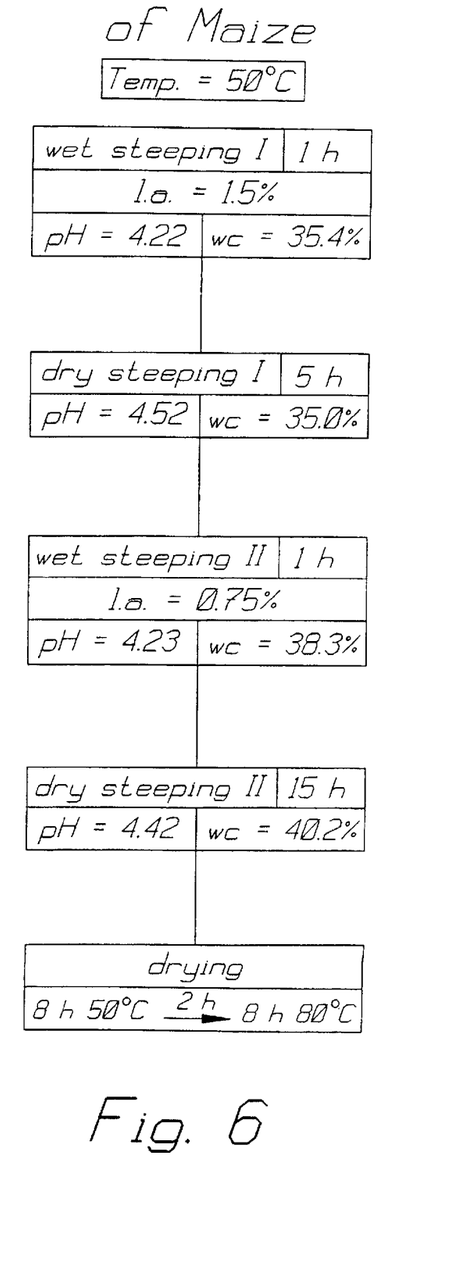
FIG. 6 shows a steeping diagram relating to the cereals type maize at a temperature, throughout, of 50° C.

The test was performed in a two stage cycle comprising wet+dry+wet+dry steeping at a temperature of 50° C. and at a pH value of 4.2–4.5. It was shown that an acceptably good result was obtained by hydrothermal treatment of maize. A steeping scheme concerning the above mentioned test is shown in FIG. 6.

EXAMPLE 30 (rice)

A test was made in the same way as described above in connection to other types of cereals. The test was made in a two stage cycle comprising wet+dry+wet+dry steeping at a temperature of 45° C. and at a pH value of 4.2–4.7. It was shown that a very good result was obtained by hydrothermal treatment of rice. The result is shown in the following table:

| Phosphate | $IP_3$ | $IP_4$ | $IP_5$ | $IP_6$ | Red. $IP_6$ (%) |
|---|---|---|---|---|---|
| Raw material | 0.00 | 0.11 | 0.87 | 9.34 | — |
| Rice | 0.06 | 0.04 | 0.02 | 0.02 | 99.8 |

The product thereby obtained, which has a reduced content of phytate (phytic acid), can be used as foodstuff, or as a raw material for several combined foodstuffs, either in the form of a cut product or in the form of a ground product. In the following is given some examples of the use thereof.

For baking or for use in food dishes there can be used whole or cut cereal grains treated according to the invention, preferably as a 20% admixture of hydrothermally treated grains in flour for baking of bread.

Suitable products in which the cereal grains treated according to the invention can be used are complete cereal compositions for children or adults like porridge and milk cereal drink compositions which can contain

| | |
|---|---|
| cereals according to the invention | 30–50% |
| fat | 5–25% |
| milk powder/whey | 15–35% |
| vitamins and minerals according to recommended values. | |

Further, flakes can be made for use in porridge or in müesli. Hereby the degree of gelatinization of starch can be varied by a succeeding water-heat treatment.

The product is also very suitable as animal feedstuff.

The final product, Hydrothermally Treated Cereals Grains, according to the above examples, were analysed with respect to the total amount of bacteria (heterotrophic aerobic bacteria) mesophilic and thermophilic lactic acid bacteria, coliforms, fecal coliforms, aerobic spore forming bacteria, Bacillus cereus, mesophilic and thermophilic anaerobic spore forming bacteria, Pseudomonas spp, yeasts, moulds, and in particular Aspergillus, Penicillium and Fusarium. For said tests samples were taken before and after a first and a second steeping cycle, before drying and after drying. The total amount of bacteria varied in several taken samples before drying between <50 and $5 \times 10^3$ CFU/g, whereby the mean value was 750 CFU/g. In the dried final product the amount of bacteria was between <5 and 500 CFU/g, with the mean value 70 CFU/g. Anaerobic spore forming bacteria and Bacillus cereus could not be found in any sample. Mould was present only sporadically. Lactic acid bacteria and aerobic spore forming bacteria were found in an amount of <50 to 100 CFU/g. In the raw material there was $10^4$–$10^7$ CFU/g. coliforms, Pseudomonas spp. and yeasts, however, could not be found after the process according to the invention.

The shelf life of the final product according to the invention was investigated in that the product was analysed as concerns the peroxide value, hexanal and by organoleptic tests by a test panel. It was found that the shelf life, after the product had been stored for 6 months, was at least 25–35% better than that of cereals of the same type which had been heat treated in conventional way. This means that the shelf life of a product prepared in accordance with the invention is very good. This may seem surprising considering the fact that the fat content as such is not affected by the process. A theory is that lipoxygenase present in the cereal grains is inactivated. In the process, and this normally happens at 50–60° C. and at pH 4–5.

In a series of succeeding tests the effect of performing the wet and dry steeping under varying pressures was tested, namely at pressures between 0.5 and 6 bar. As expected the reduction of phytate followed quicker at high pressures and slower at low pressures. By reducing the temperature and, concurrently therewith, increasing the pressure, and vice versa, the same cycle times could be kept as mentioned in the above examples.

It is evident from the above description and from the illustrating examples that there are three different parameters which are of importance for making it possible to perform the process in a practical and economical way, and for obtaining a product having a desired reduction of phytic acid, namely a) the pH value of the water during the wet steeping process, b) the temperature at which the wet steeping process and the dry steeping process, respectively, is performed, and c) the time during which the wet steeping and the dry steeping, respectively, is performed.

It is evident that a) the pH value should be between pH 4 and pH 7, preferably between pH 4.5 and 5.5, b) that the temperature during the wet steeping should preferably be between 35 and 55° C. and during the dry steeping between 35 and 55° C., and that c) the wet steeping should be performed at a period of between 0.5 and 10 hours, preferably between 1 and 2 hours, and that the dry steeping should be performed at a period of between 0.5 and 20 hours, preferably between 5 and 15 hours.

What is claimed is:

1. A method of reducing the content of phytate and/or its salts formed by phytic acid and/or high contents of phytase in cereal grains, wherein the cereal grains are subjected to a combined wet steeping and dry steeping in at least two successive cycles in that the cereal grains are mixed with water or a water solution, the pH value is adjusted to pH 4–7, the mixture is heated to a predetermined temperature and is subjected to a wet steeping for a period of 0.5–10 hours, eventual excess of water or water solution is drained, and the cereal grains are subjected to a dry steeping for a period of 0.5–20 hours at a predetermined temperature, so that the water content of the hydrothermally treated cereal grains is 25–60%, whereupon the cereal grains are finally dried.

2. A method according to claim 1 executed for processing cereals having a high content of phytic acid, wherein both the wet steeping process and the dry steeping process if performed at a relatively high temperature of for instance 35–60° C.

3. A method according to claim 1 for processing cereals having a high content of phytase, wherein a relatively low steeping temperature is used at the steeping process and that the final drying of the cereals is made slowly and at a relatively low temperature.

4. A method according to claim 1 wherein the cereal grains are, in a first stage, mixed with water or a water solution to a water content in the cereal grains of 25–35%, the pH value is adjusted to 4.25–5.5, the mixture is heated to 35–55° C. and is wet steeped for a period of 0.5–2 hours, eventual excess of water or water solution is drained, and the cereal grains are dry steeped at a temperature of 35–55° C. for 0.5–6 hours, the cereal grains are, in a second stage, mixed with water or a water solution to a water content in the cereal grains of 35–60%, the pH value is adjusted to pH 4.25–5.5, the mixture is heated to 35–55° C. and is wet steeped a second time for a period of 0.5–2 hours, whereupon eventual excess of water or water solution is drained and the cereal is dry steeped at a temperature of 35–55° C. for a period of 0.5–20 hours.

5. A method according to claim 4, wherein the second cycle comprising the wet and dry steeping is repeated once or several times, whereupon the cereal is finally dried.

6. A method according to claim 1 wherein the pH value of the water or the water solution is adjusted by an addition of an organic acid or a buffer, selected from the group consisting of lactic acid, whey, citric acid, an acetate buffer, fruit juice, and a lactic acid producing bacteria.

7. A method according to claim 6, wherein the pH value is adjusted by an addition of lactic acid in a percentage of 0.2–1.5% of the added water.

8. A method according to claim 6, wherein the pH value is adjusted by an addition of lactic acid in a percentage of 0.4–1.0% of the added water.

9. A method according to claim 1, wherein the wet steeping is performed for the same period or for different periods at each successive wet steeping process, and that the dry steeping process is likewise performed for the same periods at each successive dry steeping.

10. A method according to claim 1, wherein the final drying is performed at a temperature of 40–110° C., for a time that the cereal grains get a moisture content of less than 10%, whereupon the grains are cooled.

11. A method according to claim 1, wherein the cereal grains are pressed to flakes and are dried directly after the combined wet/dry steeping process has been finished, or in that whole cereal grains are taken out directly after they have been dried and cooled, or in that the hydrothermally treated cereal grains, after having been dried and cooled, are polished and cut, or are ground into flour.

12. A method according to claim 1 in connection to treatment of grains of wheat, rye, rye-wheat, barley, maize, rice, millet, sorghum wherein the product is taken out after two or three successive wet/dry steeping cycles.

13. A method according to claim 1 in connection to treatment of grains of oats, wherein the wet/dry steeping cycle is performed as least three, or up to eight successive cycles at the same temperatures or at a stepwise increased treatment temperature.

* * * * *